(12) United States Patent
Herron

(10) Patent No.: US 6,285,451 B1
(45) Date of Patent: Sep. 4, 2001

(54) NONCONTACTING OPTICAL METHOD FOR DETERMINING THICKNESS AND RELATED APPARATUS

(76) Inventor: John M. Herron, 5102 Karrington Dr., Gibsonia, PA (US) 15044

(*) Notice: Subject to any disclaimer, the term of this patent is extended or adjusted under 35 U.S.C. 154(b) by 0 days.

(21) Appl. No.: 09/560,521

(22) Filed: Apr. 28, 2000

Related U.S. Application Data

(60) Provisional application No. 60/132,115, filed on Apr. 30, 1999.

(51) Int. Cl.$^7$ .................................................. G01B 11/06
(52) U.S. Cl. ..................................... 356/382; 250/559.27
(58) Field of Search ................................. 356/381, 382, 356/239.1, 625, 630, 631, 632, 635, 639, 640; 250/559.19, 559.24, 559.27, 559.28, 559.29

(56) References Cited

U.S. PATENT DOCUMENTS

| | | | | |
|---|---|---|---|---|
| 3,807,870 | * | 4/1974 | Kalman | 356/239 |
| 3,994,599 | * | 11/1976 | Southwell | 356/382 |
| 4,201,475 | * | 5/1980 | Bodlaj | 356/381 |
| 4,368,641 | * | 1/1983 | McLeod, Jr. | 356/428 |
| 4,815,856 | * | 3/1989 | Bruce | 356/357 |
| 4,822,171 | | 4/1989 | Brand et al. | 356/382 |
| 4,859,861 | * | 8/1989 | Mersch | 356/382 |
| 4,902,902 | * | 2/1990 | Tole | 356/382 |
| 5,032,004 | * | 7/1991 | Steinle . | |
| 5,046,849 | * | 9/1991 | Severin et al. | 356/357 |
| 5,118,954 | * | 6/1992 | Grosso | 356/386 |
| 5,210,592 | * | 5/1993 | Bretschneider | 356/382 |
| 5,289,265 | * | 2/1994 | Inoue et al. | 356/382 |
| 5,291,271 | | 3/1994 | Juvinall et al. | 356/382 |
| 5,636,027 | | 6/1997 | Spengler et al. | 356/382 |
| 6,055,058 | * | 4/2000 | Krahbichler et al. | 356/381 |

* cited by examiner

Primary Examiner—Hoa Q. Pham
(74) Attorney, Agent, or Firm—Webb Ziesenheim Logsdon Orkin & Hanson, P.C.

(57) ABSTRACT

A noncontacting method of inspecting a transparent article in order to determine the thickness thereof including: directing a light beam having generally parallel rays onto a first point of the exterior surface of the article, directing reflected light from the first portion onto a first sensor, establishing relative movement between the light beam and the article to a second point where the light refracted into the article is directed out of the first point and onto the first sensor, and employing the reflected and refracted light to determine wall thickness of the article. The method may be repeated a plurality of times in order to determine wall thickness of the article at a number of locations. The angle of the wall being inspected is preferably determined in order to enhance the accuracy of the wall thickness determination. The apparatus of the present invention includes a light source, a first sensor for receiving light reflected from a first point on the exterior surface of the article and converting the light into a corresponding electrical signal. A first sensor also receives light entering at a second point, refracted into the article and reflected from the rear surface of the article through the same first point and converts that refracted light into a corresponding electrical signal and processor means are provided for converting the reflected and refracted light, and the relative beam movement into a determination of wall thickness at the first point. A measurement based on the angles of the wall at the first point and the second point is determined in order to enhance accuracy of the thickness determination.

30 Claims, 4 Drawing Sheets

NONCONTACTING OPTICAL METHOD FOR DETERMINING THICKNESS AND RELATED APPARATUS

CROSS-REFERENCE TO RELATED APPLICATION

This application claims the benefit of U.S. Provisional Patent Application Serial No. 60/132,115, filed Apr. 30, 1999.

BACKGROUND OF THE INVENTION

1. Field of the Invention

The present invention relates to a method of determining the thickness of an article by employing a noncontacting means and associated apparatus; and more specifically, it relates to such a system for determining wall thickness of transparent articles or portions of articles.

2. Description of the Prior Art

There are a number of known systems for measuring the thickness of transparent objects. These can be divided into two categories, (a) those that contact the object such as capacitive sensors, and (b) those that are noncontacting that measure reflection, scattering, or absorption of radiation. Noncontact techniques have been developed for measuring objects that have well-defined relationships of the inner and outer surfaces such as the cylindrical and coaxial surfaces of drawn glass tubing, some molded containers, and the parallel surfaces of plate glass, for example. For accurately measuring the thickness of irregular objects such as most molded containers, available techniques have been limited.

U.S. Pat. No. 5,636,027 discloses a noncontacting thickness measurement apparatus wherein reflected light is measured by sensing means in order to determine thickness of object made of transparent material. Beam splitters are also employed. See also U.S. Pat. No. 4,902,902.

U.S. Pat. No. 5,291,271 is directed toward measurement of wall thickness of a transparent container employing laser light and sensors receiving light reflected from the surface of the container at a first point and refracted into the container emerging at a second point with a view toward determining thickness.

U.S. Pat. No. 4,822,171 shows a noncontact method to measure wall thickness of a transparent article by projecting a narrow band of light in a longitudinal direction employing sensors that receive light reflected from the surface of the article and refracted into the container emerging at a second portion of the article.

In spite of the foregoing known systems, there remains a need for providing an improved means for measuring the thickness of transparent articles.

SUMMARY OF THE INVENTION

The present invention solves the above-described problems by providing a method of inspecting an article which includes directing a light beam having generally parallel rays onto a first portion or point of the exterior surface (first surface) of the article, directing reflected light from the first portion or point onto a first sensor with an optical system, establishing relative movement between the light beam and the article until the refracted light entering the article reflects from a rear surface of the article and is refracted out of said first portion and onto said first sensor and employing the reflected and refracted light to determine wall thickness of the article at the point. The relative movement between the article and the beam may be the beam moving in a direction generally perpendicular to the beam direction or may be through movement of the article as by translation thereof, for example.

The method may be employed to determine the angles of the walls being measured.

The article may be a hollow article such as a container or a tube composed of a transparent material.

The apparatus for inspecting the article in the present invention includes a light source, an optical system, and a first sensor for receiving light reflected from a first point on the exterior surface of the article and converting the reflected light into a corresponding electrical signal. The first sensor also receives light refracting into the article, which is reflected from the rear surface, which exits through the first point and converts the refracted light into a corresponding electrical signal. A processor means is used to convert the reflected and refracted light into a determination of wall thickness at the first point. The angles of the walls may also be determined.

It is an object of this invention to provide a noncontacting system for accurately measuring the thickness of transparent hollow objects.

It is a further object of the invention to provide thickness measurement of irregular surfaces of different diameters where only a small portion of the circumference of the container is accessible.

It is yet another object of the present invention to permit simultaneous measurement of the angles of the walls and thickness thereof.

It is yet another object of the present invention to provide such a system which permits greater lateral displacement of the article being inspected due to the use of a scanning beam.

It is a further object of the present invention to provide such a system, which minimizes focus and positional errors.

These and other objects of the invention will be more fully understood from the following description of the invention with reference to the figures appended hereto.

DESCRIPTION OF THE PREFERRED EMBODIMENTS

The method of the present invention includes providing a light beam which has generally parallel rays and causing it to impinge on a first point of the exterior of the article with light reflected from that point being directed by an optical system onto a first sensor. Relative movement is established between the light beam and the article until, at a distant point, the refracted light which reflects from the rear surface of the article exits out at the first point to the first sensor with the reflected and refracted light being employed to determine the wall thickness of the article. In a preferred approach, the angles of the article at these points are also determined in order to refine the determination of thickness. A microprocessor is employed to receive electrical output from the sensor corresponding to the light impinging thereon.

The method involves repeated cycles of thickness determination around the circumference of the article. Also, more than one sensor system may be provided at different elevations so as to permit multiple circumferential inspection of the article. In addition, more than one sensor may be provided at the same elevation for adjacent circumferential thickness measurements.

Figure 1:
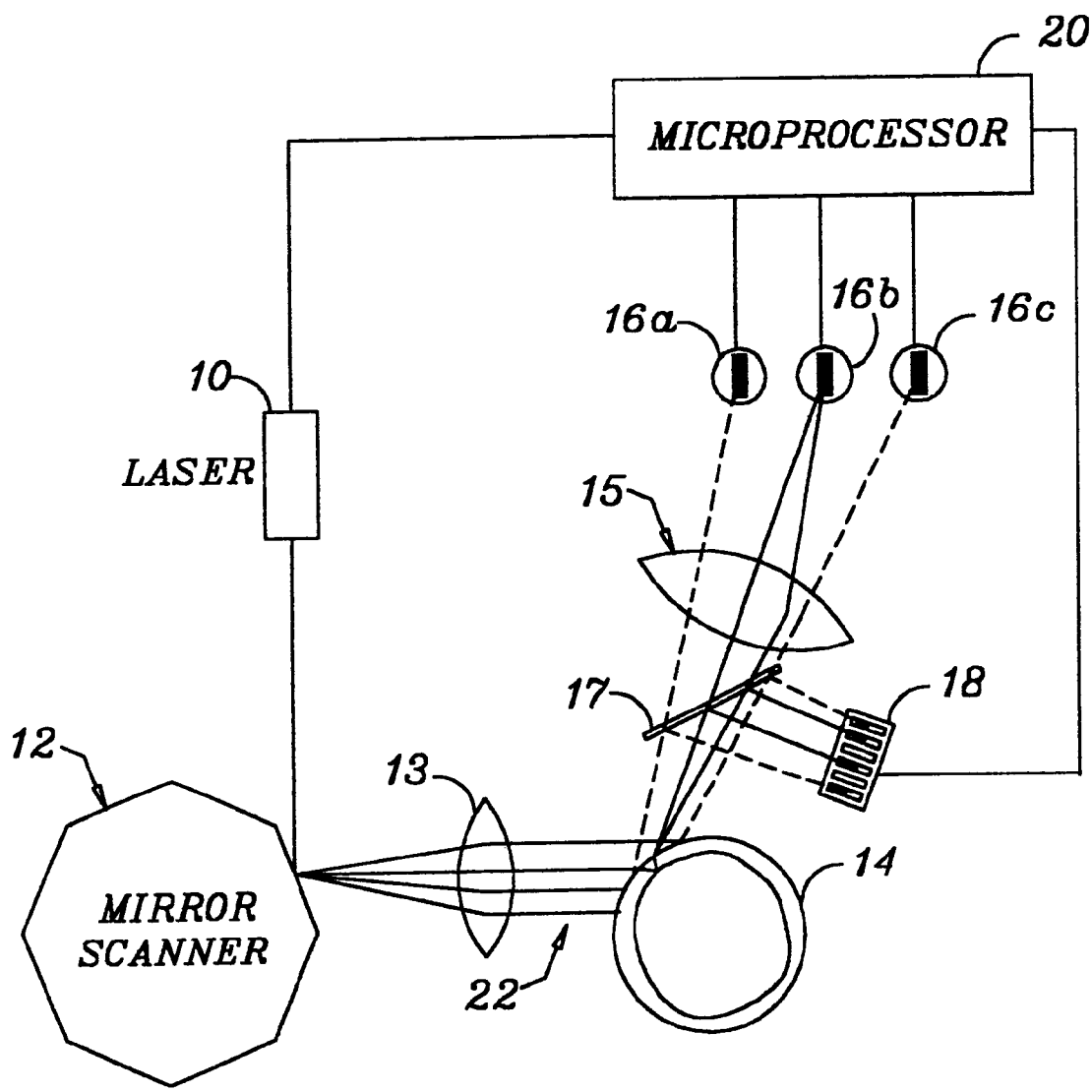
FIG. 1 is a schematic illustration of one embodiment of the apparatus and related method of the present invention.
Figure 2:
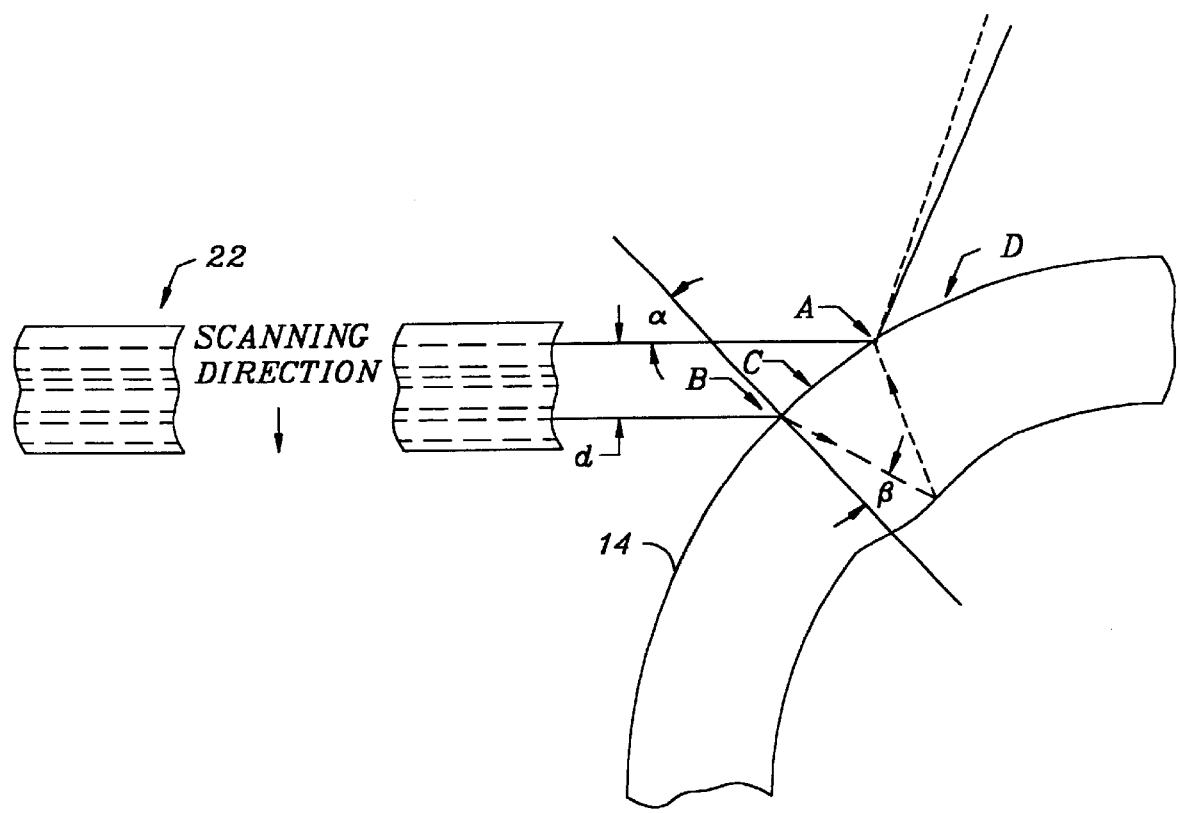
FIG. 2 is a schematic illustration of a portion of the system of the present invention and an associated wall.

As shown in FIG. 1, a scanning light beam is produced by a light source 10, such as a laser, a beam deflection apparatus 12, such as a polygon mirror scanner, and a collimating lens 13. These devices are configured to produce parallel rays of small beam diameter at the surface of the article 14. An optical system 15 images points on the surface of the object on to one or more sensors 16a, 16b, and 16c that consist of a slit aperture prior to each photo-detector. Each sensor 16a, 16b, and 16c will detect any reflected or refracted beam emanating from their respective imaged points on the surface of the object, and all other beams from other points on the surface will be excluded. As the beam 22 traverses the article, two signals will be produced by each sensor 16a, 16b, and 16c. For detector 16b, the first signal will be due to the exterior surface (first surface) reflection of the scanning beam at point A as seen in FIG. 2. As the beam transverses across the object, there will exist a distant point B, where the scanning beam will refract into the object, reflect off the rear (second surface), and exit the object at A. The distance d the beam 22 travels is calculated from the beam scanning velocity and the time interval between the sensor pulses. The angles of the first surface reflections at A and B, and the second surface reflection from the beam entering at point B which refracts out at point A, may be determined by splitting the beam by beam splitter 17 of FIG. 1 and using one or more photo-detectors 18 to measure time correlated events. This detector need not employ a slit aperture. Other sensors 16a and 16c can acquire measurements from the neighborhood points. An example of which are C and D in FIG. 2 as shown by the dashed lines in FIG. 1 which impinge on sensors 16a and 16c. The process may be repeated a number of times to determine thickness at a number of circumferential locations.

It will be appreciated that sensors 16a, 16b, and 16c provide electrical signals to microprocessor 20 responsive to light impinging on the sensors 16a, 16b, 16c. Microprocessor 20 also controls the generation of the scanning light beams from light source 10. Microprocessor 20 also receives electrical signals from photo-detectors 18.

By using a large incident angle alpha as shown in FIG. 2, the shift in the refractive angle beta produced by local changes in the first surface slope are reduced. With the large incident angle alpha and the measurement of angle of the first surface reflected beam at point A, the angle of the refracted beam at point A, and the distance d the beam travels, can provide an accurate estimate of the wall thickness. In a preferred embodiment, the angle alpha, which is the angle at which the light beam impinges upon the exterior surface of the article with respect to the perpendicular to the wall, will impinge at an angle of about 45 to 80 degrees. An example for the use of the angle technique is the inspection of containers that are formed in a mold.

Figure 3:
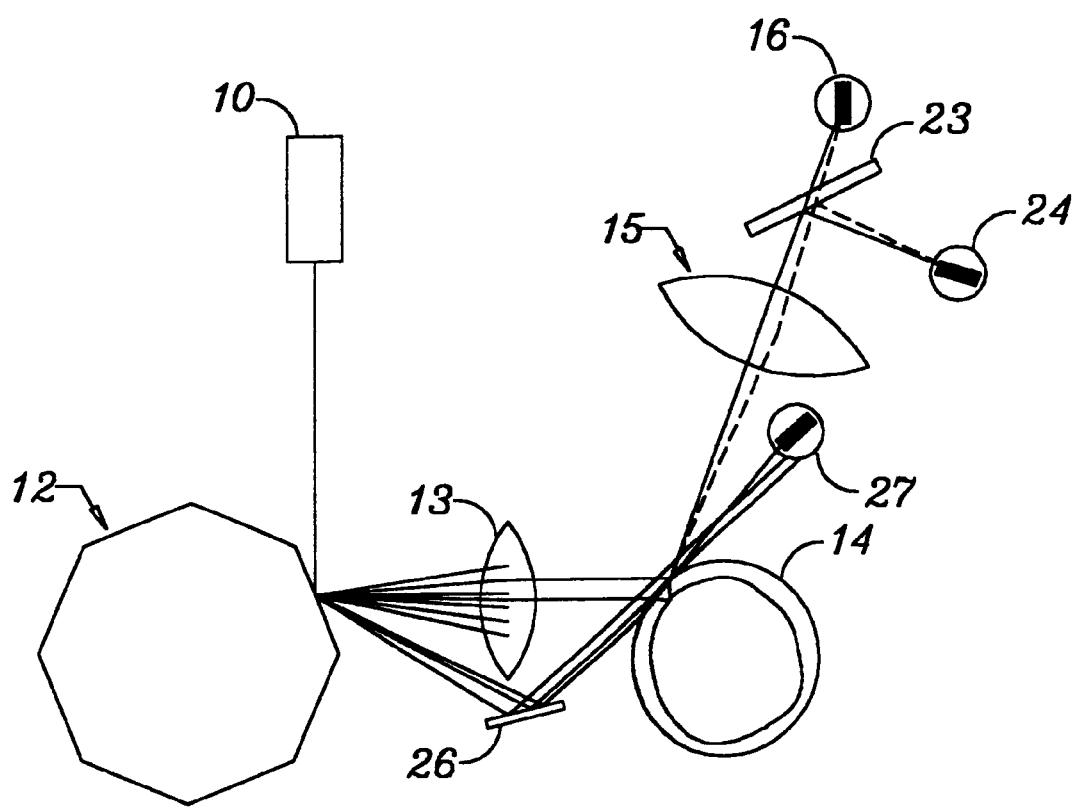
FIG. 3 is a schematic illustration of a modified form of the invention.

The determination of the location of the thickness measurement and correction of some measurement errors produced by varying the apparatus or measuring gage to article distances can be accomplished by various techniques, one of which is the use of a beam splitter 23 and an additional sensor 24 not in the image plane of sensors 16 as shown in FIG. 3. Comparison of the pulse widths will determine the object position along one axis and the time correlation to the scanning beam will determine the object position along another independent axis.

Object to gauge distance may also be determined by using a mirror 26 to deflect a portion of the scanning beam to provide a tangential scan as shown in FIG. 3. The sensor 27 will detect the reflected rays from the wall of the object. The electrical output signals of sensors 16, 24 and 27 will be delivered to microprocessor 20 (not shown in this view).

A large angle of incidence is used to increase the reflected energy and to reduce the effects of slope changes on the first surface, however, any incident angle may be used from the perpendicular of the surface to the point of total internal reflection of the scanning beam.

The scanning beam may be at any angle relative to the axis of the object and is not limited to the method shown in the figures wherein the scanning beam is perpendicular to the object axis.

A non-parallel scanning beam may be used when the gauge to object distance can be determined.

Rotation of the object will provide thickness measurements at defined intervals of one level. If the beam collimating lens 13 provides two-dimensional imaging capability, additional lasers that are directed at the mirror scanner and additional sensors in the image plane of optical systems 15 could provide multiple levels of measurements. If additional lasers are added in the same scanning plane, multiple thickness measurements of a rotating object may be taken during each scanning interval.

It will be appreciated that the articles may be colored and infrared laser light may be employed. Such uses shall be deemed to be included within the term "transparent" as employed herein with reference to articles.

Figure 4:
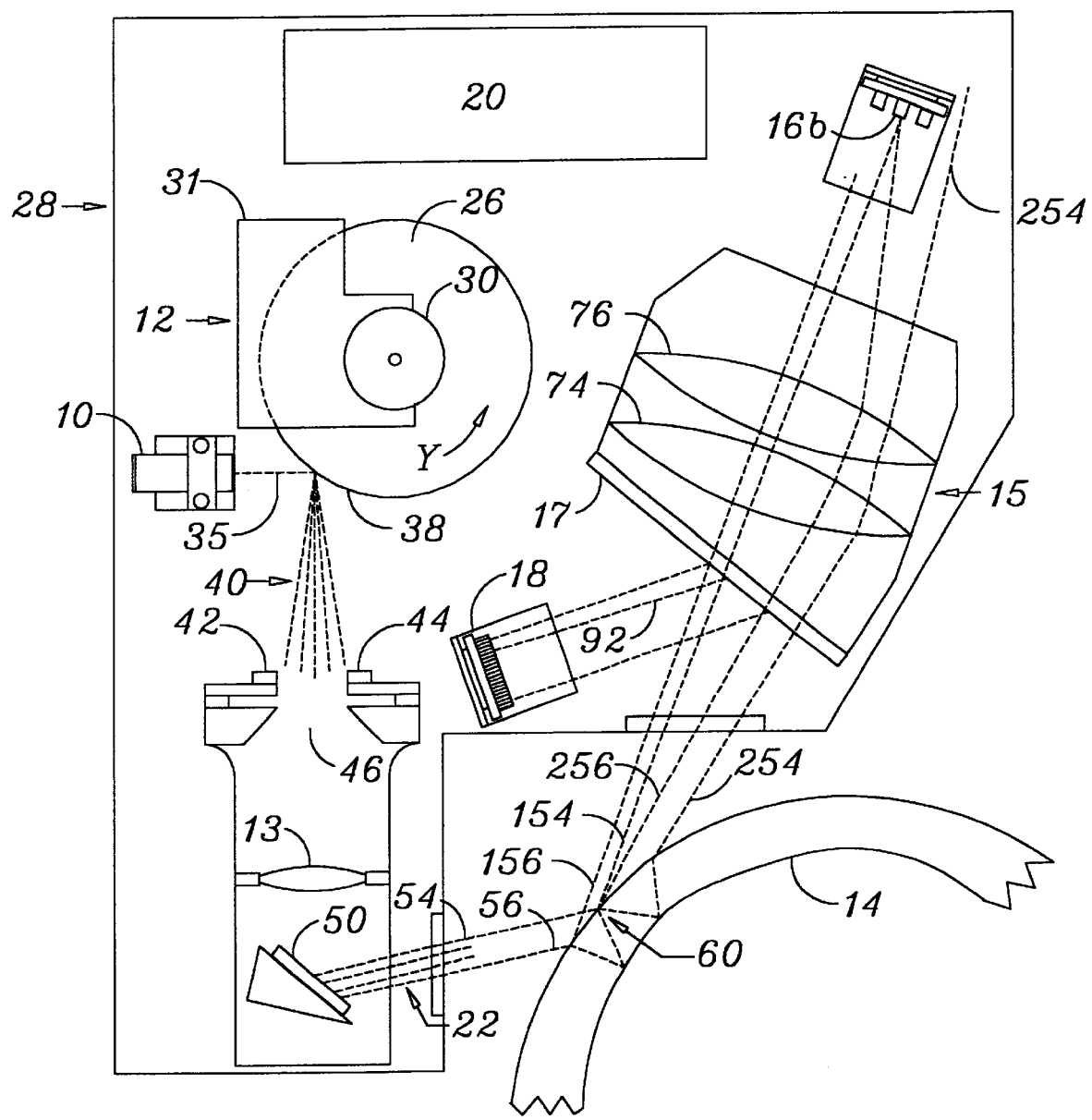
FIG. 4 is a top plan view of one form of the apparatus of the present invention.

Referring to FIG. 4, an example of apparatus suitable for use in the present invention will be considered. The apparatus has a housing 28 with a microprocessor 20 suitably connected to the various components by leads (not shown in this view). The beam deflection apparatus 12 with a mirror 26 (36 sided) is operatively associated with a motor 30 and a controller 31 to move the light beam responsive to axial rotation of the mirror which may occur in the direction of arrow Y. A suitable light source 10 which may advantageously be a laser diode emits a laser beam 35 which is reflected off the outer surface 38 of mirror 26 and creates a scanning beam 40. A start of scan detector 42 and end of scan detector 44 serve to determine the rotational velocity of the mirror 26 and also when the scanning beam 40 is passing through aperture 46 on to collimating lens 13 which in turn reflects off of mirror 50 to establish beam 22. Beam 22 has a plurality which is composed of a large number of individual beams, such as 54 and 56. Article 14 has point 60 on which beam 54 impinges and produces a resultant reflective beam 154 and refractive beam 254, and are transmitted by optical system 15 which contains a plurality of optical components 74 and 76, which cause the reflective beam 154 to impinge on one of the sensors 16b which is operatively associated with the microprocessor 20. Refractive beam 254 misses sensor 16b. Beam 56 would partially refract into the article 14, reflect back and exit as beam 256, go through the lenses, and strike sensor 16b. Beam 156 misses sensor 16b. Beam splitter 17 serves to direct a portion of the light as indicated by beam 92 to one or more photo-detectors 18 which serve to determine the angles of the beams at the point being inspected and provide additional information to the microprocessor so that the thickness determination delivered by sensor 16b and the angle determination delivered by photo-detectors 18 may be combined in the microprocessor to establish an accurate thickness determination.

It will be appreciated that in the preferred embodiment of the invention the determination of surface angles as described herein enables microprocessor 20 to enhance the accuracy of the thickness measurements obtained through sensors 16a, 16b, and 16c of FIG. 1.

As the software employed in the microprocessor 20 will be readily known or created by those skilled in the art, a detailed disclosure of the same is not required.

Whereas particular embodiments of the invention have been disclosed for purposes of illustration, it will be evident to those skilled in the art that numerous variations of the details may be made without departing from the invention as defined in the appended claims.

What is claimed:

1. A method of inspecting an article comprising:
   directing a light beam on to a first point of the exterior surface of said article;
   directing reflected light from said first point onto a first sensor;
   establishing movement between said light beam and said article to a second point where light refracted into the article reflects from a rear surface of said article and exits out of said first point and onto said first sensor; and
   employing said reflected and refracted light to determine the wall thickness of said article at said point.

2. The method of claim 1, including repeating said method a plurality of times in order to determine wall thickness of said article at a number of locations.

3. The method of claim 2, including employing said method or an article transparent at some visible or non-visible wavelength.

4. The method of claim 3, including employing a light-generating source to provide light to an optical component which converts the light into said light beam.

5. The method of claim 4, including employing at least one optical component to direct said reflected and refracted light onto said first sensor.

6. The method of claim 5, including employing said sensors which convert received light into a corresponding electrical signal.

7. The method of claim 6, including employing a microprocessor for converting electrical signals emerging from said sensors into wall thickness determinations.

8. The method of claim 3, including employing said method on articles which generally have surface curvature.

9. The method of claim 8, including employing said method on tubular articles.

10. The method of claim 8, including employing said method on containers.

11. The method of claim 10, including employing said method on glass containers.

12. The method of claim 10, including employing said method on resinous plastic containers.

13. The method of claim 2, including effecting said relative movement by axial rotation of said article.

14. The method of claim 1, including:
   causing said light beam to impinge upon the exterior surface of said article at an angle of about 45 to 80 degrees with respect to the perpendicular to said surface, creating an impinging angle;
   determining the reflective angles between said light beams which impinge on the exterior surface and a perpendicular to that surface;
   determining the refractive angle between said exiting light beam which reflects from the rear surface of said article and exits through said first point and a perpendicular to the first point; and
   employing said impinging angle, reflective and refractive angles and the distance of travel of said light beam between the reflective beam established at said first point and the refractive beam exiting through said first point to determine wall thickness of said article at said point.

15. The method of claim 1, including directing said reflected light beam and said refracted light beam from said first point onto sensor means to determine the angle of the reflected and refracted light beams.

16. The method of claim 15, including employing a beam splitter to permit redirection of said reflected light beams and refracted light beam onto said angle determining sensors without preventing impingement of said beams on said first sensor.

17. The method of claim 1, including effecting said relative movement between said light beam and said article by moving said light beam.

18. The method of claim 17, including effecting said light beam movement in a direction generally perpendicular to said direction of the light beam.

19. The method of claim 1, including effecting said relative movement by translational movement of said light beam and rotational movement of said container.

20. An apparatus for inspecting an article comprising:
   a light source;
   a first sensor for receiving light reflected from a first point on the exterior surface of said article and converting said reflected light into a corresponding electrical signal;
   said first sensor receiving light refracting from a second point on the exterior surface of said article, reflecting from the rear surface and refracting through said first point and exiting through said first point and converting said refracted light into a corresponding electrical signal; and
   a processor for converting said reflected and refracted light into a determination of wall thickness at said first point.

21. The apparatus of claim 20, including a first optical component means for converting light emitted by said light source into a light beam having a generally parallel scanning beam.

22. The apparatus of claim 21, including a second optical component for focusing light emitted by said reflected and refracted light onto said first sensor.

23. The apparatus of claim 20, including means for determining the angle of the reflected and refracted beams of said wall at said first point and the angle of the reflected beam of said wall at said second point.

24. The apparatus of claim 23, including angle determining means providing input to said processor for determining thickness of said wall.

25. The apparatus of claim 20, including said processor for initiating scanning light beams from said light source.

26. The apparatus of claim 20, including means for establishing relative movement between the light beam impinging on said article and said article.

27. The apparatus of claim 26, including said means for establishing relative movement including means for translating the light beam which impinges on said article in an axial direction.

28. The apparatus of claim 26, including said means for effecting relative movement including means for axially rotating said article.

29. The apparatus of claim 26, including said means for effecting relative movement effecting both translational movement of said light beam and rotational movement of said article.

30. The apparatus of claim 20, including said apparatus being structured to receive and inspect said article.

* * * * *